(12) United States Patent
Mandavilli et al.

(10) Patent No.: US 6,738,076 B1
(45) Date of Patent: May 18, 2004

(54) METHOD AND SYSTEM FOR MAINTAINING PERSISTANCE OF GRAPHICAL MARKUPS IN A COLLABORATIVE GRAPHICAL VIEWING SYSTEM

(75) Inventors: Swamy Mandavilli, Fort Collins, CO (US); Philip A. Flocken, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 09/629,124

(22) Filed: Jul. 31, 2000

(51) Int. Cl.[7] ............................................... G06T 15/00
(52) U.S. Cl. ................................................... 345/733
(58) Field of Search ............................. 345/473, 474, 345/475, 733, 734, 735, 753, 754, 755

(56) References Cited

U.S. PATENT DOCUMENTS 6,067,571 A * 5/2000 Igarashi et al. ............. 709/232
6,362,817 B1 * 3/2002 Powers et al. .............. 345/419
6,363,404 B1 * 3/2002 Dalal et al. ................. 707/513
6,414,677 B1 * 7/2002 Robertson et al. .......... 345/419

* cited by examiner

Primary Examiner—Phu K. Nguyen (57) ABSTRACT

A method and system for maintaining persistence of graphical markups created within a collaboration environment that associates graphical markups with the camera position is presented. The collaboration tool provides utilities to allow saving the graphical markups to the user's local disk, saving the graphical markups into a PDM system (either locally or remotely), and saving the entire collaboration session including graphical markups, notes, action items, etc. When saved to persistent storage, all the camera positions and all graphical markups associated with them are stored in the markup file. The saved markups/session can later be reloaded from the user's local disk or a PDM system as appropriate. When a session is loaded into the collaboration session, all of the camera positions and associated graphical markups from the saved session are then accessible, allowing simple viewing of the results of the session, continuation-of-work, or asynchronous collaboration. After a markup file is loaded the contents are accessible to all the members of the current collaboration session.

2 Claims, 7 Drawing Sheets

METHOD AND SYSTEM FOR MAINTAINING PERSISTANCE OF GRAPHICAL MARKUPS IN A COLLABORATIVE GRAPHICAL VIEWING SYSTEM

FIELD OF THE INVENTION

The present invention pertains generally to collaboration environments, and more particularly to a method and system for maintaining persistence of graphical markups in a collaborative graphics environment that associates graphical markups to camera positions.

BACKGROUND OF THE INVENTION

Computer Aided Design (CAD) systems make it possible to create 3-dimensional models of parts and assemblies. At the same time, synchronous collaboration systems such as CoCreate, Inc.'s OneSpace, now allow remotely located users to communicate via a synchronously coupled view of one or more 3D objects. Collaboration environments are very useful in assisting communication between remotely located product designers, and between suppliers and manufacturers.

The use of graphical markup tools, which provide functionality for drawing shapes and adding text on the screen without modifying the 3-D model, enhances the communication ability of collaboration session members. As an example, suppose a first company manufactures automobiles that require a certain screw assembly which are supplied by a second company that specializes in manufacturing the screw assemblies. Engineers from the first and second companies can enter a collaborative graphical viewing environment to allow them to simultaneously view 3D models of the screw assembly. In the collaborative environment, because the views of each session member are coupled, one engineer can point a cursor at a point on the 3D screw assembly object shown on the screen, and the other engineers will see where that cursor is being pointed to. Collaborative markup tools allow better communication through a variety of shapes such as circle, arrows, and textual markups. For example, if it is desired to communicate to the screw assembly manufacturer to verify the length dimension of a pin in the screw assembly as displayed on the screen, a rectangle shape can be drawn around the pin on the screen and a text note attached requesting "Check pin length". In the synchronous collaboration environment, the newly added markup will appear on the screens of every participating collaboration session member.

Often, it is desirable to save the results of a collaboration session to reload later. For example, it may happen that, due to the time constraints of participating members, a synchronous collaboration session must end before completion of the collaborative effort. In this case, it would be desirable to be able to save the current state of the collaboration session and to be able to reload it later in order to continue the collaborative effort. As another example, all desired parties may not be available during the time the synchronous collaboration session is conducted. It would therefore be desirable in this case to save the results from the collaboration session, including named camera position views and graphical markups associated with those camera positions, for later viewing by members who were absent.

SUMMARY OF THE INVENTION

The present invention is a method and system for maintaining persistence of graphical markups created within a collaboration environment that allows users to save and reload camera position views and their associated markups. The graphical markup persistence capability of the invention is implemented in a collaborative graphical viewing system that associates graphical markups to named camera positions. In this type of collaborative graphical viewing system, the view seen on the screen is that seen by the camera; in other words, the rotation can be thought of as if the camera were moving rather than the object viewed by the camera. In this system, markups associated with a given camera position appear only when the view is rotated to the view corresponding to that camera position and disappear when the view is rotated to another camera position.

In accordance with the method of the invention, as the collaboration session member(s) begin to create graphical markups, a markup module associates the markups with the camera position at which the markups are made. The collaboration tool provides utilities to allow saving the graphical markups to the user's local disk, saving the graphical markups into a PDM system (either locally or remotely), and saving the entire collaboration session including graphical markups, notes, action items, etc. When saved to persistent storage, the camera position and all graphical markups associated with that camera position are stored in the markup file. The saved markups/session can later be reloaded from the user's local disk or the PDM system as appropriate. When a saved session is loaded into the collaboration session, all of the camera positions and associated graphical markups from the saved session are then accessible, allowing simple viewing of the results of the session, continuation-of-work, or asynchronous collaboration.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

The present invention enables persistence of graphical markups associated with named camera positions created within a collaborative graphical environment.

Figure 1:
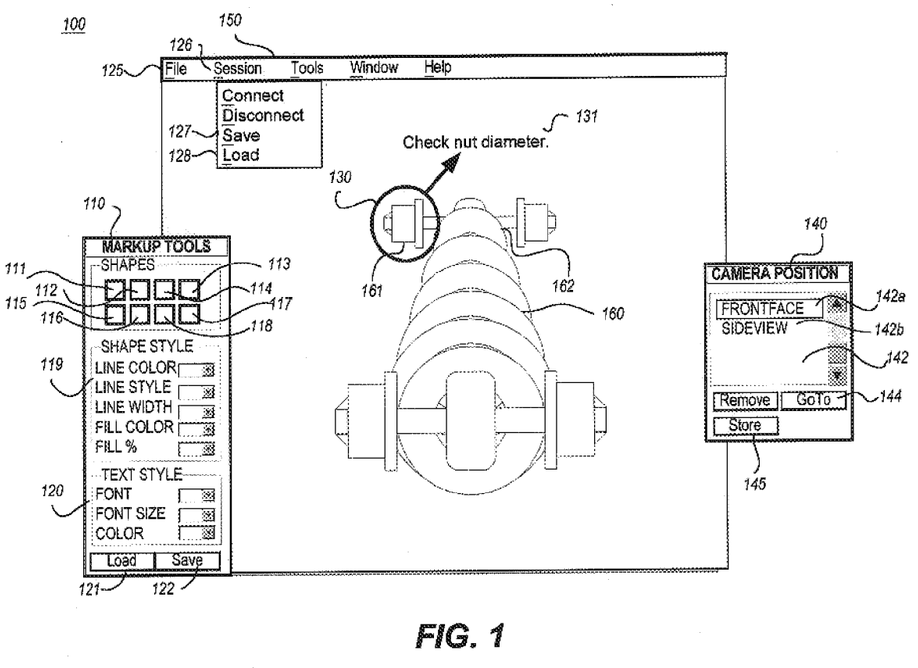
FIG. 1 is an illustrative embodiment of a graphical user interface displaying one 3D model view associated with a named camera position in accordance with the invention.

FIG. 1 is an example graphical user interface 100 of a graphical viewing system in which the invention is implemented. Graphical user interface 100 comprises a viewing area 150, a markup dialog 110, and a named camera position list window 140.

Viewing area 150 is the display area for displaying a 3D object 160. In the illustrative example, the 3D object 160 is a screw assembly with, of particular interest in this example, a nut 161 and a pin 162. In the graphical viewing system of the invention, the view seen on the screen is that seen by the camera; in other words, the rotation can be thought of as if the camera were moving rather than the object that the camera is looking at. Each view of the 3-D model is associated with a different camera position. Thus, every named camera position can have associated markup items that will show up when the view is rotated to the markup's associated camera position.

In FIG. 1, the view of screw assembly 160 seen by the user in viewing area 150 is the front face of the screw. With the camera position arranged as such, the diameter of nut 161 may be easily measured.

Graphical user interface 100 includes a named camera position list window 140. Named camera position list window 140 may be permanently displayed in the graphical user interface 100, or alternatively may be implemented as a pop-up window, a drop-down menu, a tabbed pane, or any other well-known implementation for displaying a list on a screen. Named camera position list window 140 displays a list 142 of named camera positions 142*a*, 142*b*. As illustrated, the camera position associated with the front face displayed in viewing area 150 of FIG. 1 has been previously named FrontFace 142*a*. Because the front face view associated with the camera position named FrontFace 142*a* is currently displayed in the viewing area 150, the name FrontFace 142*a* in named camera position list window 140 is highlighted to indicate that it is the selected view. Other named camera positions, for example SideView 142*b*, are also listed in the named camera position list window 140.

In the illustrative embodiment, named camera position list window 140 includes a "GoTo" button 144 that allows the user to select a named camera position 142*a* or 142*b* from the list 142 and click on the GoTo button 144 to bring up the view seen by the named camera position in viewing area 150.

The preferred embodiment graphical viewing application user interface provides two methods for associating markup items to camera positions. One method is to explicitly create a named camera position using the camera user interface in the named camera position list window 140 and then create markup items while that camera position is selected and displayed in the viewing area 150. This is accomplished in the illustrative embodiment by changing the view to a desired view, clicking on the store button 145 in the camera user interface of named camera position list window 140, and then editing the name in the store user interface to give it a desired name.

The second method is simply to allow the system to automatically create a named camera position by simply rotating the camera view to a position that displays the desired view, and then starting to create markup items. In the preferred embodiment, a new named camera position automatically pops up in the named camera position list window 140. The automatically generated name can be modified later.

Markup dialog 110 is a window comprising a plurality of markup tools available to the user to create markups over the 3D view of the object associated with a camera position. In the illustrative embodiment, markup dialog 110 is implemented as a pop-up window; however, those skilled in the art will appreciate that the markup dialog 110 may alternatively be permanently displayed in the graphical user interface 100, or implemented as a drop-down menu, a tabbed pane, or any other well-known implement for displaying a set of available functions on a screen. In the illustrative embodiment, the available functions are implemented as buttons and drop-down menus, as described herein.

As illustrated, markup dialog 110 includes functions for textual markup, 2-D shape markups such as circles 114, rectangles 113, polygons 118, lines 116, and arrows 115, a free-hand pen tool 112 for drawing arbitrary shapes, leader text tool 117 that allows a user to highlight an area and attach a text comment with a pointer. Preferably, markup dialog 110 also includes shape preference options 119 such as line color, style and width, and fill specifications for the markup objects. Markup dialog 110 also preferably includes text preference options 120 such as font, font size, and text color.

The markup dialog 110 includes SAVE and LOAD buttons 122 and 121 that a user can click to save/load markup data to/from local disc. When saving using the SAVE button 122, all the named camera positions and the associated markups are stored in the local markup file that user specifies. When loading by clicking on the LOAD button 121, all the camera positions and the associated markups are loaded from the specified local file into the current session. When a user saves the markup data into a PDM system, the Markups created in that session are saved as a file in the PDM system. Similarly, when a user loads a markup file from a PDM system, the corresponding Markup data is loaded into the session.

The graphical user interface 100 includes a toolbar 125 that includes a session drop-down menu 126 with Save and Load menu items 127 and 128. The collaboration tool allows a user to save the collaboration session data, including graphical markups if desired. In the illustrative embodiment, when the user clicks on Session→Save button 127, he/she can specify if Markup data should be saved. If he/she checks that box, Markup data is saved to a file along with other session specific information (such as Notes, Modified Model files etc.) When a user saves a session into a PDM system, the Markups created in that session are saved as a file in the PDM system. Similarly, when a user loads a session from a PDM system, the corresponding Markup data is loaded into the session.

In the illustrative embodiment of FIG. 1, a text leader markup item 130/131 has been dragged and dropped, and then sized, around nut 161, with a comment "Check nut diameter". The markup item 130/131 is associated only with this camera position (i.e., named camera position FrontFace 142*a*). In the collaborative environment, all collaboration members see the markup item 130/131 whenever their viewing area displays camera position FrontFace 142*a*.

Figure 2:
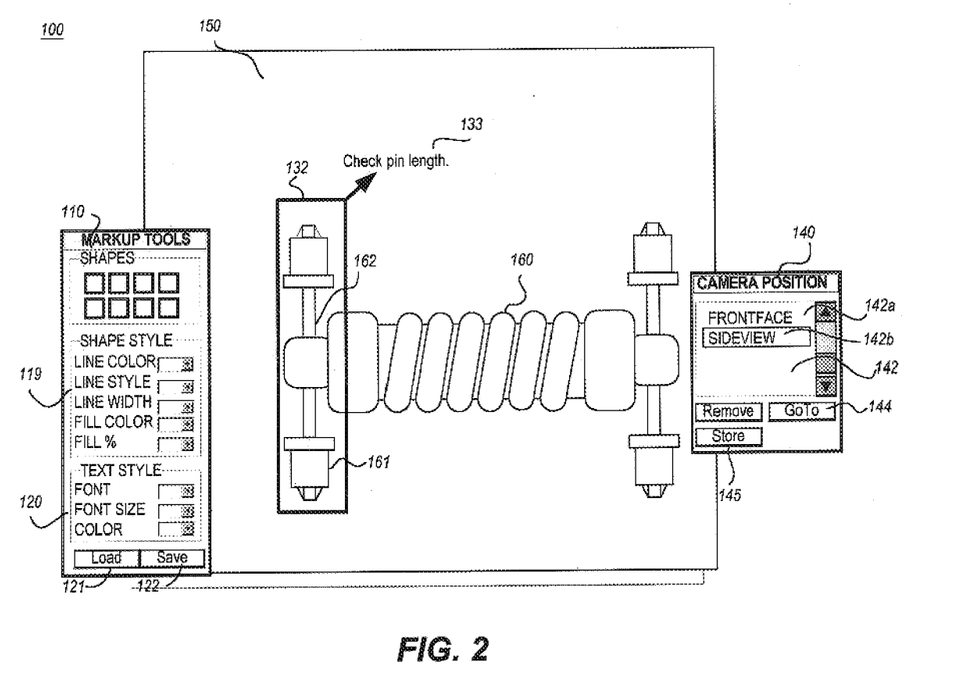
FIG. 2 is the graphical user interface of FIG. 1 displaying a second view associated with a second named camera position in accordance with the invention.

FIG. 2 is a view of the example graphical user interface 100 where the camera position has been changed to display the side view of the screw assembly 160. The camera position can be changed in one of two ways. The first method for changing the camera position is a dynamic rotation of the view. In the illustrative embodiment, dynamic camera position change is accomplished by clicking on the middle button of the mouse, which triggers the dynamic rotation function, and then dragging the mouse until the desired view of the model appears in the viewing area 150. As soon as the current camera position starts to change, any markups associated with the current camera position disappear from the viewing area 150. The second method for changing the camera position is to select a named camera position 142*a*, 142*b* from the camera position list 142 and then click on the GoTo button 144. In this case, the view of the object model(s) and markups associated with this named camera position appear in the viewing area 150, and any markups not associated with that view disappear from the viewing area 150. In the example of FIG. 2, when the SideView camera position 142*b* is selected and loaded, the markups associated with the FrontFace camera position 142*a* disappear and any markups already associated with the SideView camera position 142*b* are displayed. In this example, a markup item 132 appears around pin 162 with the note 133 "Check pin length".

Figure 3:
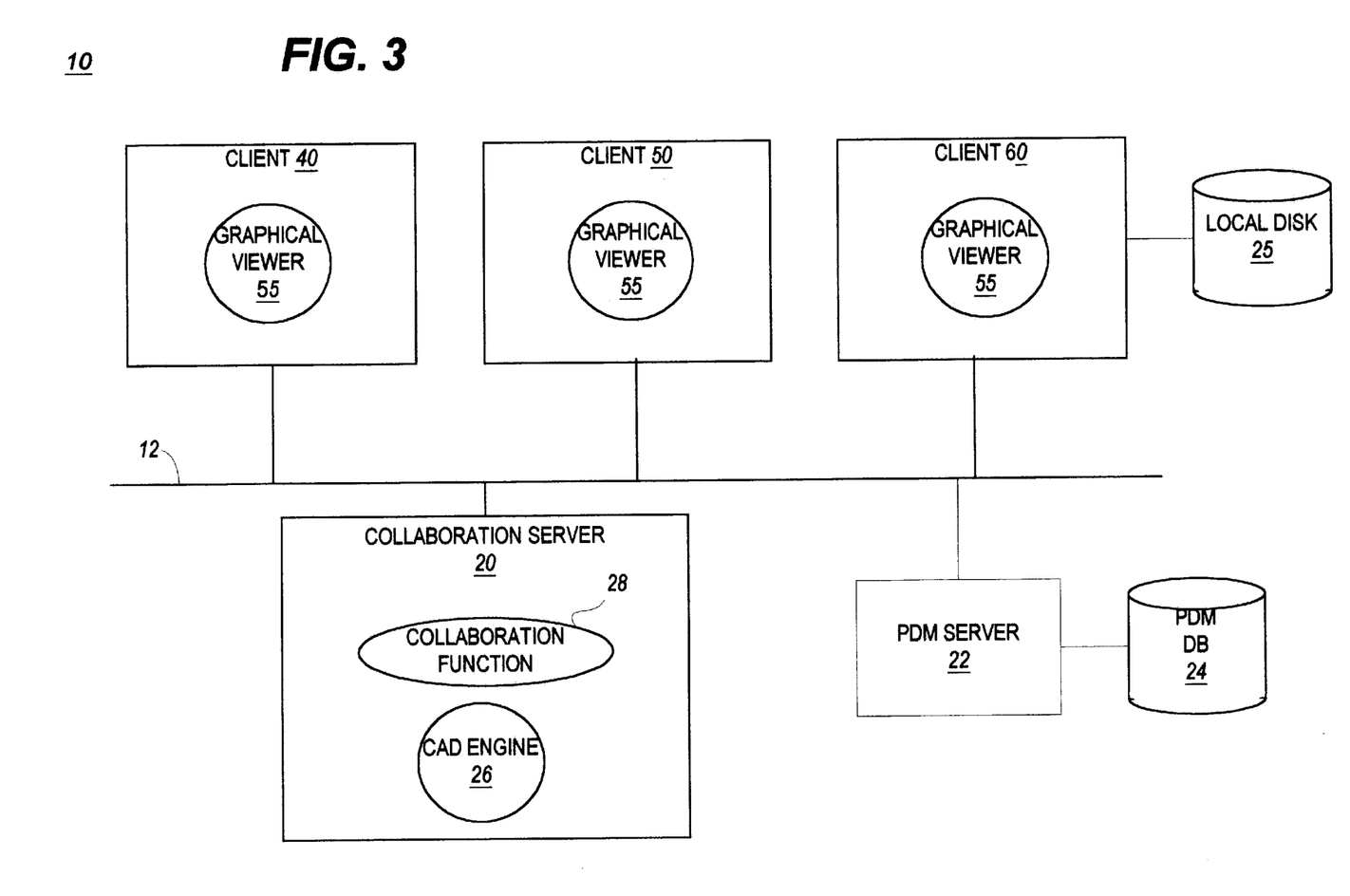
FIG. 3 is a network diagram of one preferred embodiment of a collaborative graphical viewing system in accordance with the invention.

FIG. 3 is a network diagram of one preferred embodiment of a collaborative graphical viewing system 10 in accordance with the invention. As illustrated, system 10 includes a server 20 executing a collaboration function 28 to allow two or more users to synchronously view a 3-D object and associate markups to one or more camera position views of the 3-D object. The collaboration function 28 synchronizes a plurality of graphical viewer applications 55 executing on respective clients 40, 50, and 60. The collaboration function 28 may be executed on an initiator viewer's machine, or may reside and execute on a remote host 20 separate from any of the viewer applications. Collaboration function 28 allows clients 40, 50, 60 that are executing graphical viewer applications 55 to connect to the collaborative graphical viewer session using known collaboration connection techniques, for example, those used in OneSpace, manufactured by CoCreate, Inc. While the collaborative graphical viewer session is open, members of the session simultaneously view 3D objects and can create markup items associated with camera position views that are simultaneously viewed by all session members.

For centralized data management, network 12 may also be connected to a PDM server 22, which manages and provides network-wide access to data stored in a PDM database 24. Alternatively, or additionally, any one or more of clients (in this example, client 60, as illustrated) may have a local storage disk 25. In the preferred embodiment, a client 40, 50, 60 initiates a Save operation to save either only Markups or the entire Session (including Markups) in either a local file or a local or remote PDM system.

Figure 4:
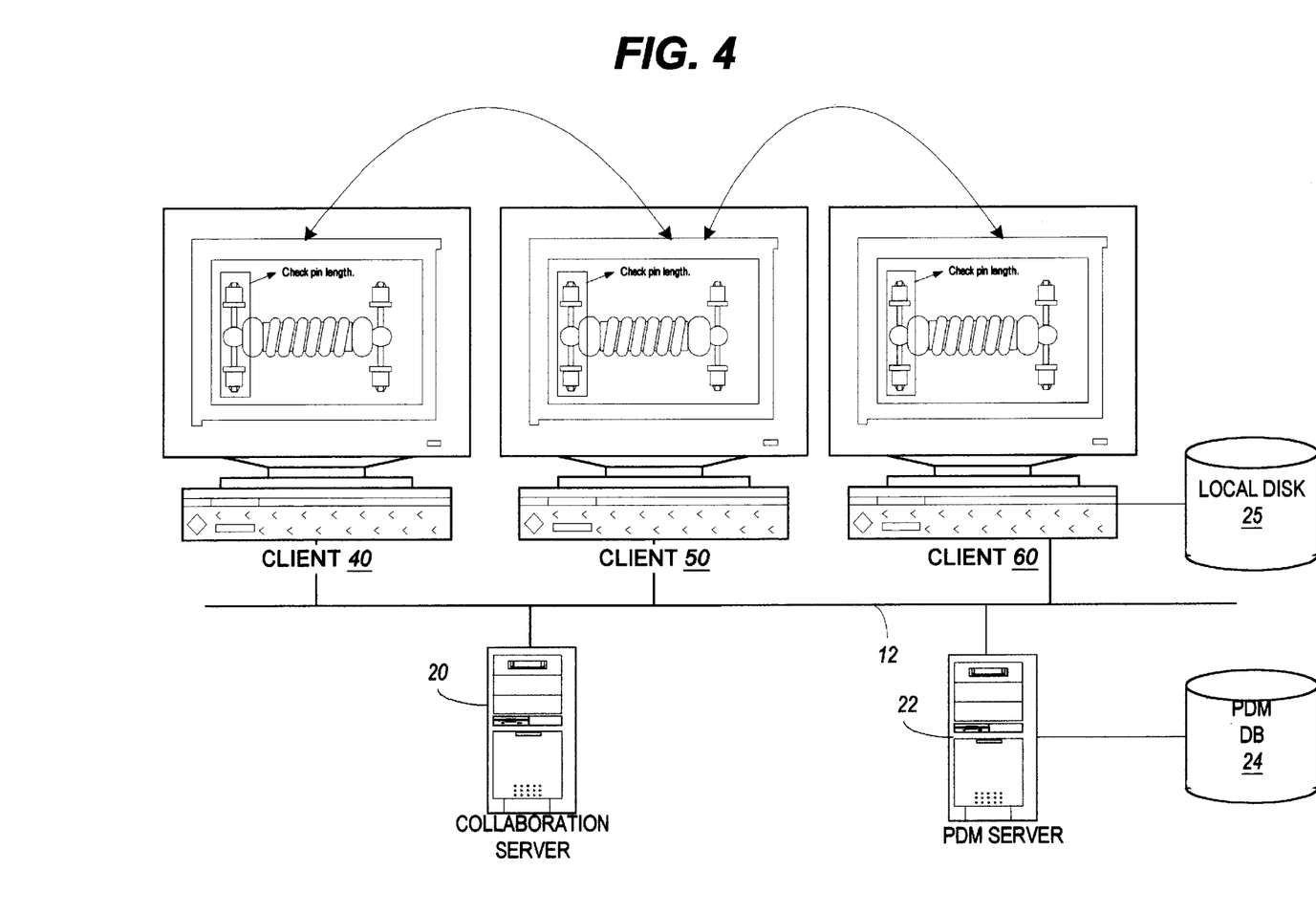
FIG. 4 is a network diagram illustrating the coupling of the graphical markups between the displays of the participating collaborative session members.

FIG. 4 is a network diagram illustrating the coupling of the graphical viewers between participating collaborative session members. As shown, the viewing area 150 of each session member is coupled to display identical camera position views and identical markup items. Each session member sees the same view of the 3D objects at the same camera position, along with the same markup items associated with the current camera position. In other words, the view displayed in the viewing area 150 of one session member is coupled to the viewing area 150 of all the other session members. The view and markup changes follow any view and/or markup changes triggered by any of the other session members. The same is true vice versa. View changes, e.g. a zooming in, moving the position or rotation of a product object, will show the same effect on the screens of all other session members. Additionally, a markup created by any session member will trigger the display of the same markup item with the same characteristics at the same position on all session members' displays.

Figure 5:
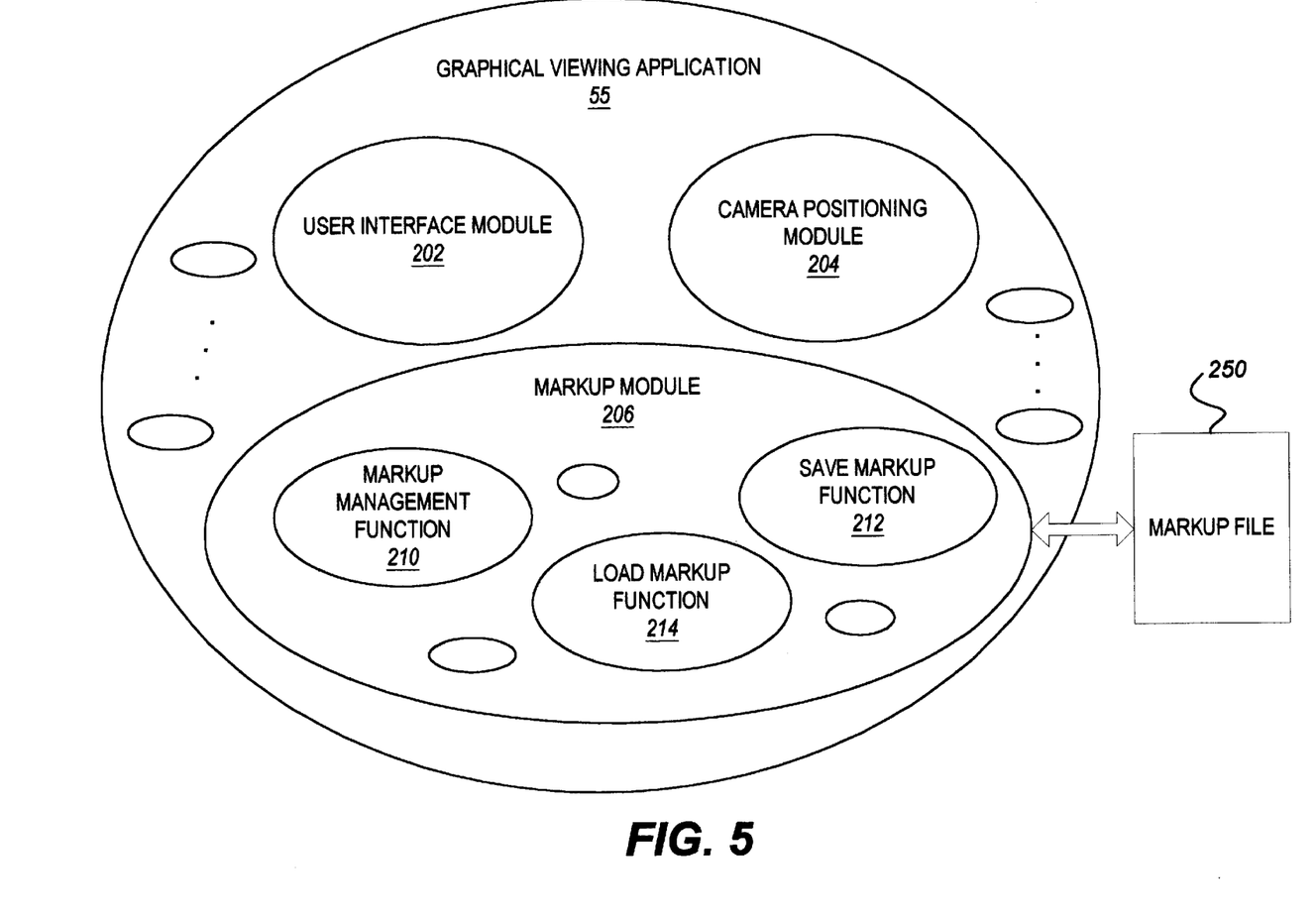
FIG. 5 is a high-level block diagram of a preferred embodiment graphical viewer application.

FIG. 5 is a high-level block diagram of a preferred embodiment graphical viewer application 55. As illustrated, graphical viewing application 55 includes a user interface module 202, a camera positioning module 204, and a markup module 206, among others. User interface module 202 implements the user interface functionality for all input from and output to the user, for example, displaying the graphical user interface 100 on the user's screen and receiving user input such as mouse clicks on the various buttons of the graphical user interface 100.

Camera positioning module 204 implements the functionality for determining the camera view for any named camera position. It knows the association between the camera position name and actual view.

Markup module 206 includes a markup management function 210 that implements the underlying functionality for each of the markup buttons and options available in the markup dialog 110 of the graphical user interface 100. Markup module 206 also includes a save function SaveMarkup 212 and a load function LoadMarkup 214. Save function SaveMarkup 212 saves all the camera positions and the associated markups in a markup file 250 in persistent storage. This is preferably triggered by clicking on a Save button 122 in the Markup dialog 110 on the graphical user interface 100.

Load function LoadMarkup 214 loads a markup file 250 associated with a previously saved session into the collaboration environment. Load function LoadMarkup 212 is invoked when the user clicks on a Load button 121 in the Markup dialog 110 on the graphical user interface 100. When a user loads a markup file, all members of the session will view the contents.

When a Markup file is loaded, the camera position names in the file can be conflicting with those of the current session. If a camera position name is used in the current session as well as the file being loaded, one of the following configurations would be applied:

Overwrite the information in the current session; OR

Ignore the file entry; OR

Load operation fails and generates errors.

Figure 6:
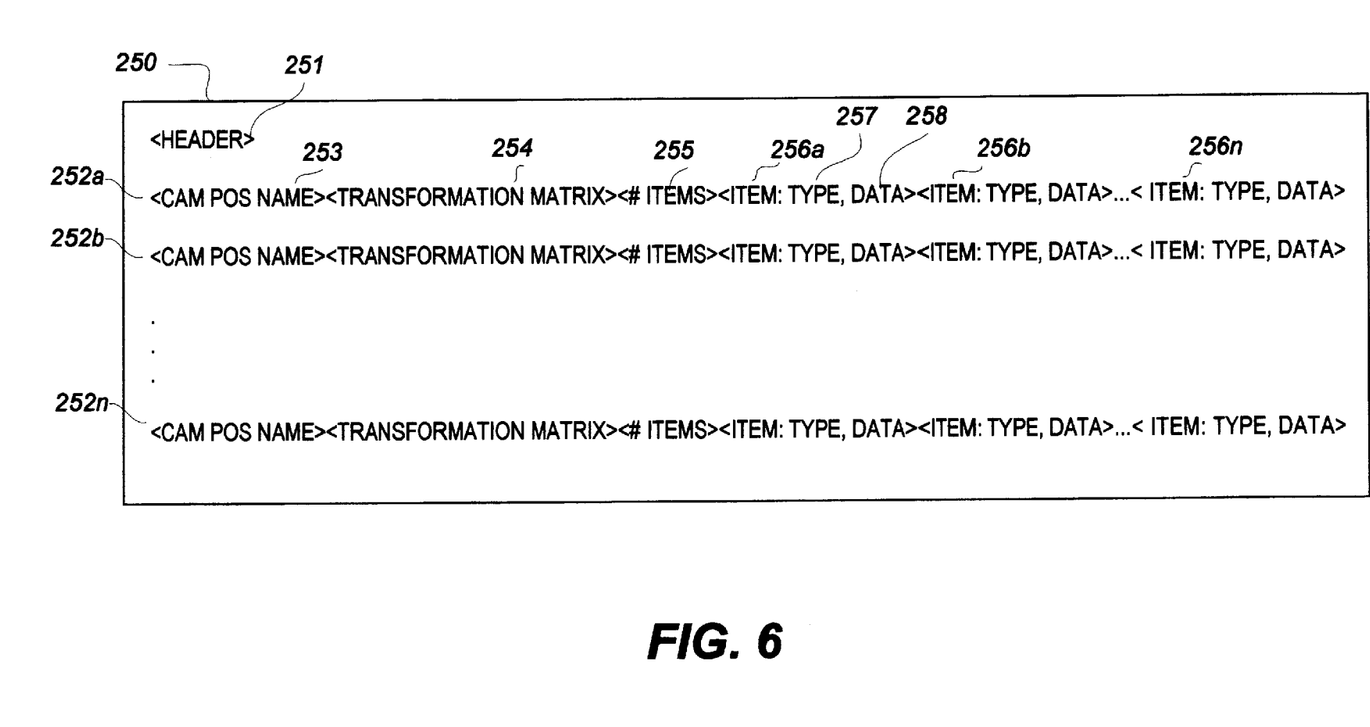
FIG. 6 is an illustrative embodiment of a markup file implemented in accordance with the invention.

FIG. 6 is an illustrative embodiment of a markup file 250 implemented in accordance with the invention. As illustrated, markup file 250 includes a header 251 at the beginning of the file, followed by one or more camera position entries 252*a*, 252*b*, . . . , 252*n*. Each camera position entry 252*a*, 252*b*, . . . , 252*n* corresponds to one named camera position. In this embodiment, each camera position entry 252*a*, 252*b*, . . . , 252*n* includes a camera position name 253, camera position coordinates 254 to define the view of the objects loaded in that view, the number of markup items 255, and one or more markup item fields 256*a*, . . . ,256*n*. Each markup item field includes a markup item type 257 and data 258 associated with that markup type.

One preferred embodiment implementation of the markup module 206 is implemented using JavaSharedDataToolkit for the collaboration functionality, Sun's Java2D Library to draw the shapes, and the following newly defined classes (shown in a class diagram in FIG. 7) to implement markup association: Markup Context 80, Markup Plane 81, MarkupWindow 82, MarkupDialog 83, MarkupItem 84, MarkupEvents 85, MarkupRectangle 86, MarkupText 88, MarkupTextEvents 89, MarkupRectangleEvents 87, MarkupCollaboration 90*a*, 90*b*, and SessionDialog 92. A brief description of each class follows:

MarkupContext 80:

Only one MarkupContext 80 instance within a client is associated with one collaboration session.

Maintains a list of all MarkupPlanes 81 that are associated with this Markup context.

Maintains a list of all MarkupWindows 82 that are associated with this MarkupContext 80.

When a MarkupItem 84 changes (creation/deletion/modification) occur on a MarkupWindow 82, the change is cascaded to all the other MarkupWindows 82 within this context that are showing the same MarkupPlane 81.

Handles Markup persistence (Save and Load).

MarkupPlane 81:

Maintains a list of MarkupItems 84.

Provides methods to add/delete/get MarkupItems 84 from this list.

Corresponds to a set of MarkupItems 84 that are drawn on a camera position view. A named camera position is a MarkupPlane 81. The first time a markup item (e.g., 130, 131, 132, 133 of FIGS. 1 and 2) is created by the user at a given camera position, an instance of a MarkupPlane 81 associated with that camera position is created along with an instance of a MarkupItem of the appropriate markup type, which is associated with that MarkupPlane 81.

A MarkupPlane 81 can be applied on zero or more MarkupWindow 82 instances at a time.

MarkupWindow 82:

One instance corresponds to a window where markup items can be drawn/displayed.

A MarkupWindow 82 can "show" one MarkupPlane 81.

Provides methods to switch to any MarkupPlane 81.

Communication between multiple clients is established at the MarkupWindow 82 level. E.g., if a rectangle is created, it sends a rectangle event message to all the clients who are "sharing" that window.

Handles the coordinates normalization and transformations. When a MarkupItem 84 needs to be drawn, it applies the appropriate transformations before drawing.

When MarkupItem 84 manipulations (create, delete, modify markup item) occur, MarkupWindow 82 is informed so that it redraws the MarkupItem 84 and communicates this information to the remote MarkupWindows 82 that are sharing this window.

MarkupDialog 83:

Responsible for showing the Markup palette and buttons for all the Markup operations.

Listens to the events on the dialog (e.g., button click)

Handles changing Markup preferences (e.g., Color) to the currently selected MarkupItem 84.

MarkupItem 84:

Base class for all the markup item types (e.g., Rectangle, Circle, Line, Text area).

Includes a Draw( ) method that draws itself on the MarkupWindow 82.

MarkupRectangle 86:

One instance of this class corresponds to one rectangle markup item created on the MarkupPlane 81.

MarkupRectangle 86 is a derivation of a MarkupItem 84.

MarkupText 88:

One instance of this class corresponds to one textual markup item created on the MarkupPlane 81.

MarkupText 88 is a derivation of a MarkupItem 84.

MarkupEvents 85:

One Instance corresponds to one Markup event type (e.g., Rectangle Creation, Selection).

Base class for all the Event handling classes for creating, selecting, modifying markup objects.

MarkupRectangleEvents 87:

Listens to user interface events to create a MarkupRectangle 86.

MarkupRectangleEvents 87 is a derivation of a MarkupEvents 85.

Markup TextEvents 89:

Listens to user interface events to create MarkupText 88.

MarkupTextEvents 89 is a derivation of a MarkupEvents 85.

MarkupCollaboration 90 (90a, 90b):

Used by MarkupWindow 82 to communicate to remote MarkupWindows 82.

One instance per MarkupWindow 82.

When a new MarkupItem 84 is created on a window, it needs to send a message to all the remote clients that are sharing this window. MarkupCollaboration 90a, 90b implements the communication with the other clients that are sharing this window. When a message is received on a Markup channel, the corresponding method on the receiving MarkupWindow 82 is invoked. A Markup channel is a JavaSharedDataToolkit channel.

SessionDialog 92:

Responsible for showing the collaboration session buttons for all the collaboration session operations (e.g., Connect, Save, Load).

Listens to the events on the dialog (e.g., button click).

When user clicks on the Save button, saves all the markup data to a file(along with modified model files, Action Items etc.).

When user clicks on the Load button, a previously stored Session information is loaded into the current session. All the Markup data including the camera position data is loaded into the current session.

Figure 7:
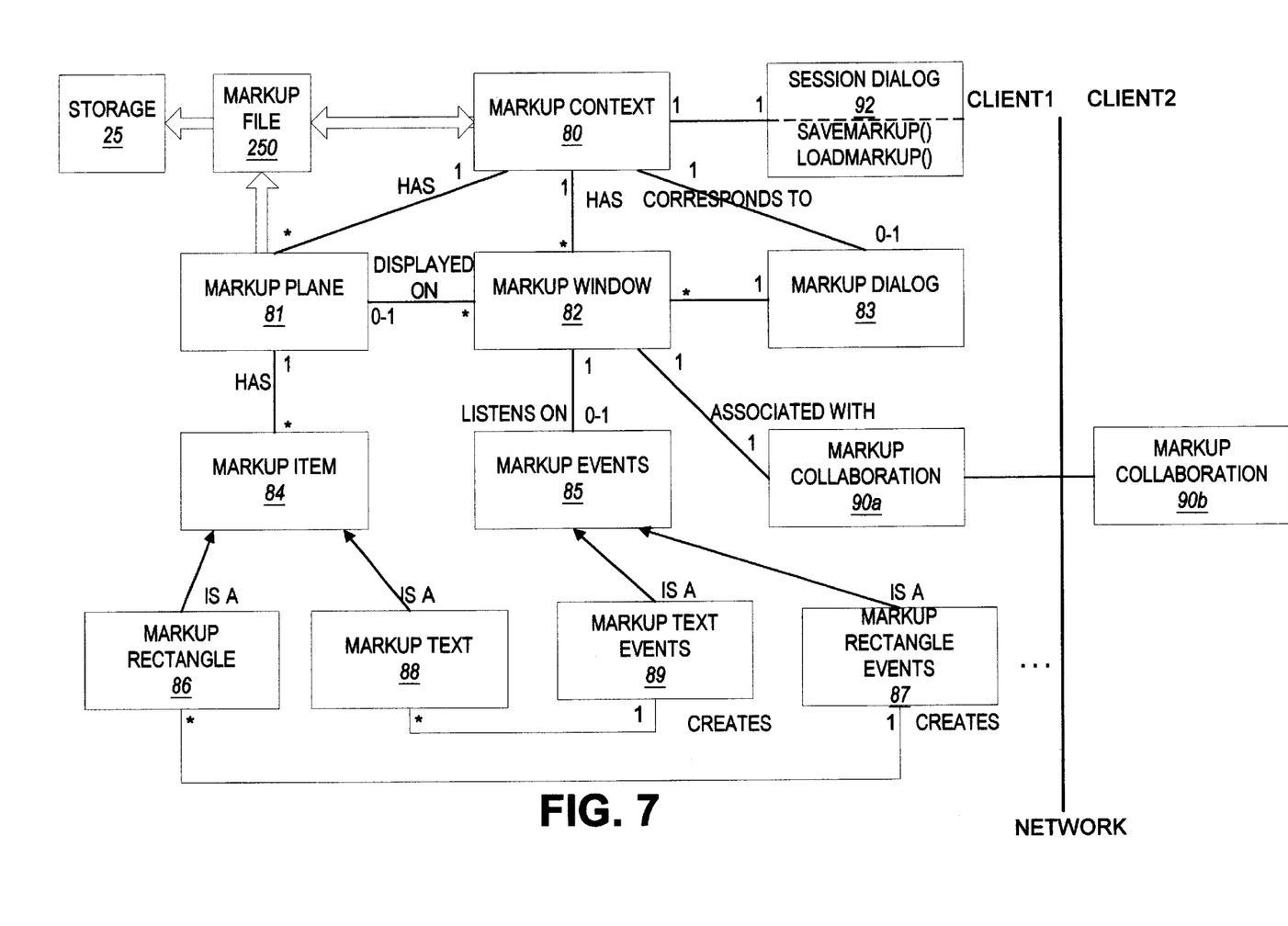
FIG. 7 is a class diagram of a set of classes used in one implementation of a markup module.

A class diagram illustrating the relationships of the classes is shown in FIG. 7. As illustrated, MarkupContext 80 has a plurality of MarkupPlanes 81, zero or one of which are displayed on a MarkupWindow. MarkupContext has a plurality of MarkupWindows 82. In a MarkupContext 80 a MarkupDialog may optionally be displayed. Each MarkupPlane 81 has a one or more Markup items 84, e.g. MarkupRectangle 86 and MarkupText 88. MarkupRectangle 86 and MarkupText 88 are derivations of MarkupItem 84. An instance of MarkupEvents listens to user interface events on a window and creates and modifies a MarkupRectangle class instance. Each MarkupWindow 82 is associated with a single MarkupCollaboration 90a. MarkupCollaborations 90a, 90b communicate, typically on the Internet 70 using JavaSharedDataToolkit technology.

MarkupContext 80 corresponds to one Session Dialog 92, which includes the methods SaveMarkup and LoadMarkup for respectively saving a collaboration session and loading a saved collaboration session.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A collaborative graphical viewing system comprising:
   a markup module which allows graphical markup items to be created and associated with a camera position, said markup module comprising a store utility which stores said created graphical markup items and associated camera position in persistent storage;

a collaboration function which allows a plurality of users to simultaneously view said loaded graphical markup items associated with said camera position.

2. A collaborative graphical viewing system in accordance with claim 1, wherein:

said store utility allows said created graphical markup items and associated camera position to be stored in a saved collaboration session in said persistent storage.

* * * * *